May 13, 1958  M. FIRL ET AL  2,834,488
BAKERY PRODUCTS DEPANNING APPARATUS
Filed Oct. 18, 1955  4 Sheets-Sheet 3
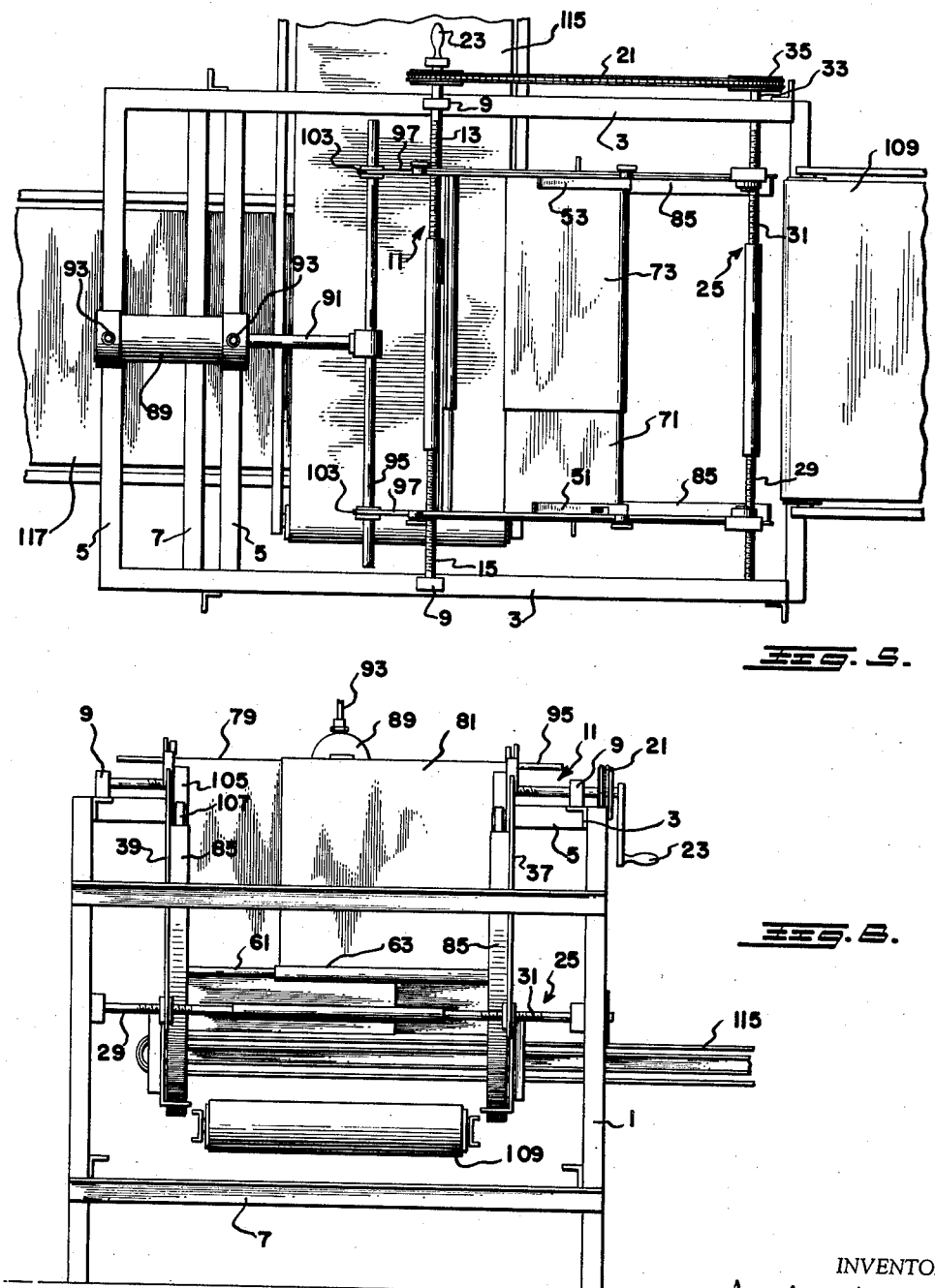
INVENTOR
Milton Firl
Elwood E. Firl
BY Peck & Peck
ATTORNEY May 13, 1958  M. FIRL ET AL  2,834,488
BAKERY PRODUCTS DEPANNING APPARATUS
Filed Oct. 18, 1955  4 Sheets-Sheet 4
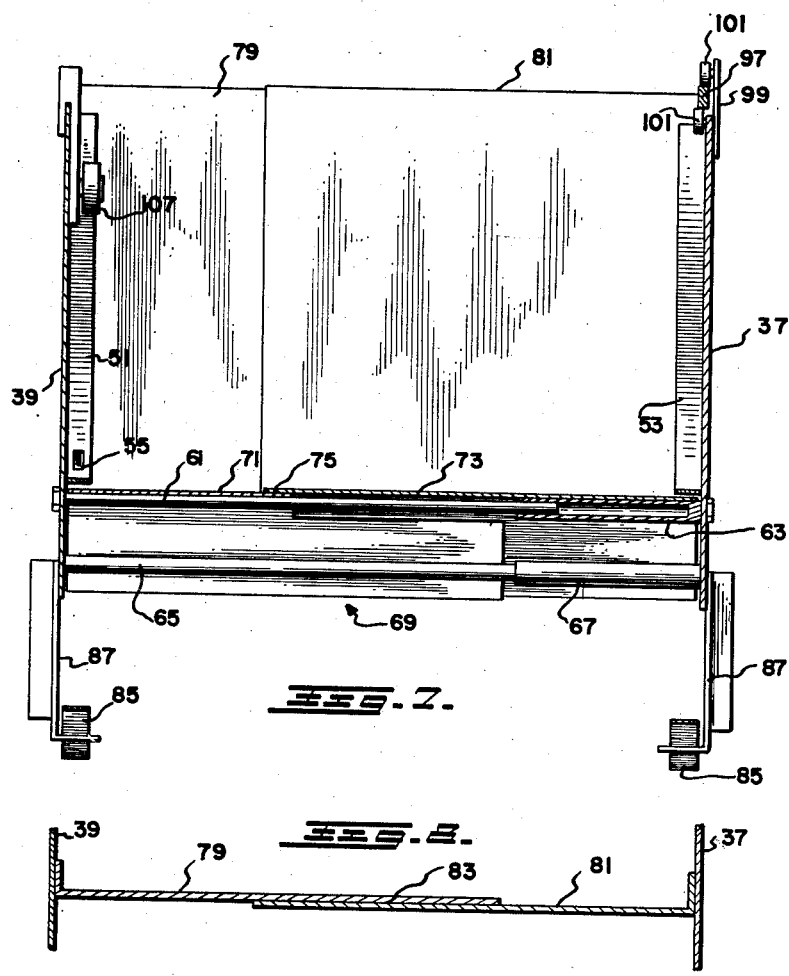
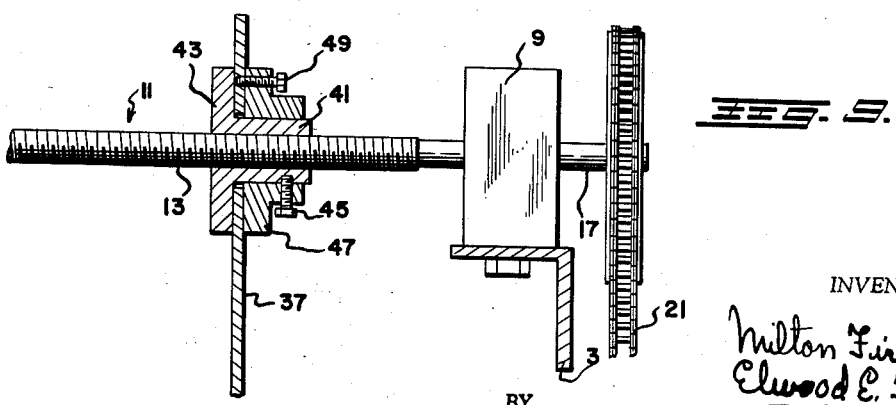
INVENTOR
Milton Firl
Elwood E. Firl
BY Pech & Pech
ATTORNEY United States Patent Office 2,834,488
Patented May 13, 1958

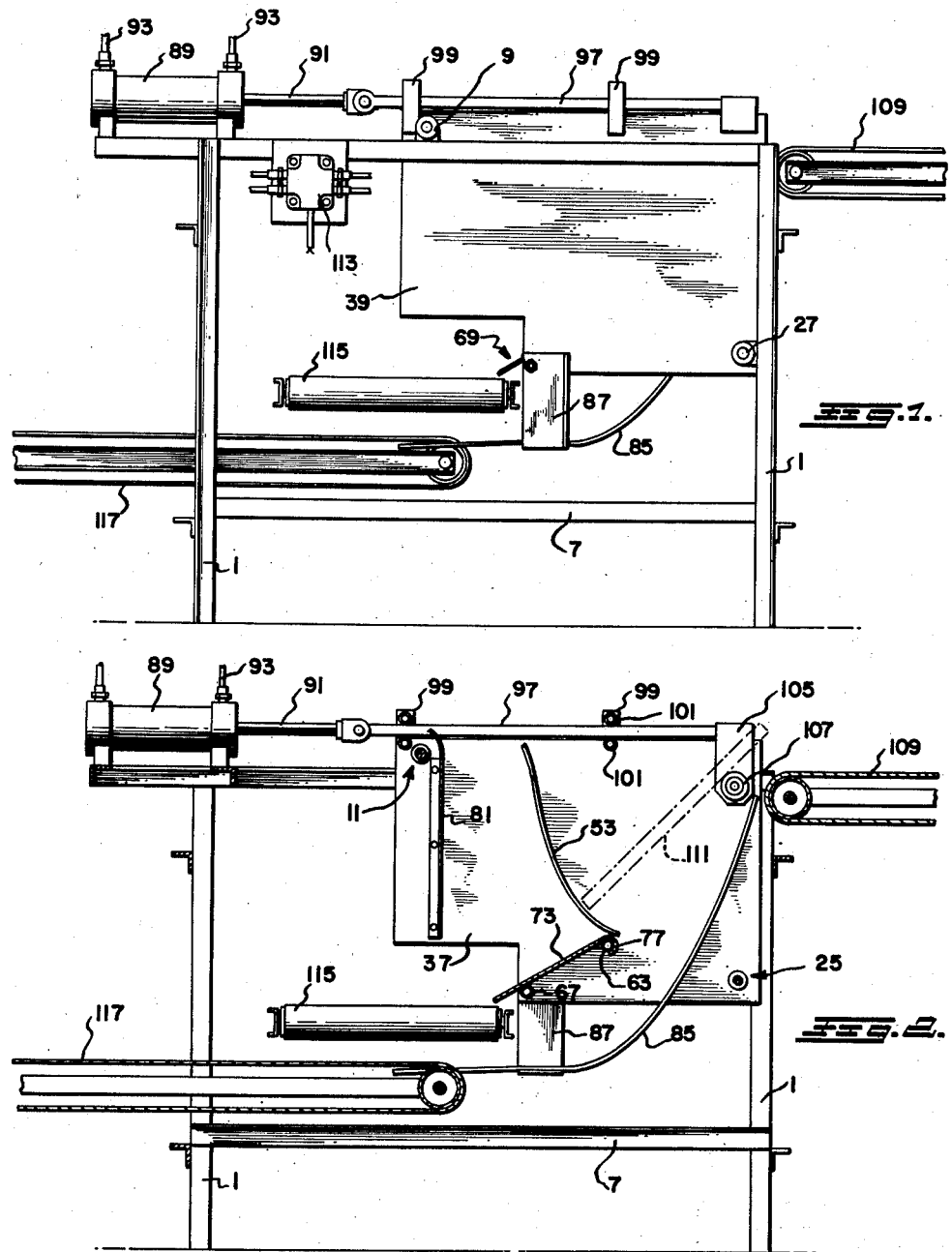

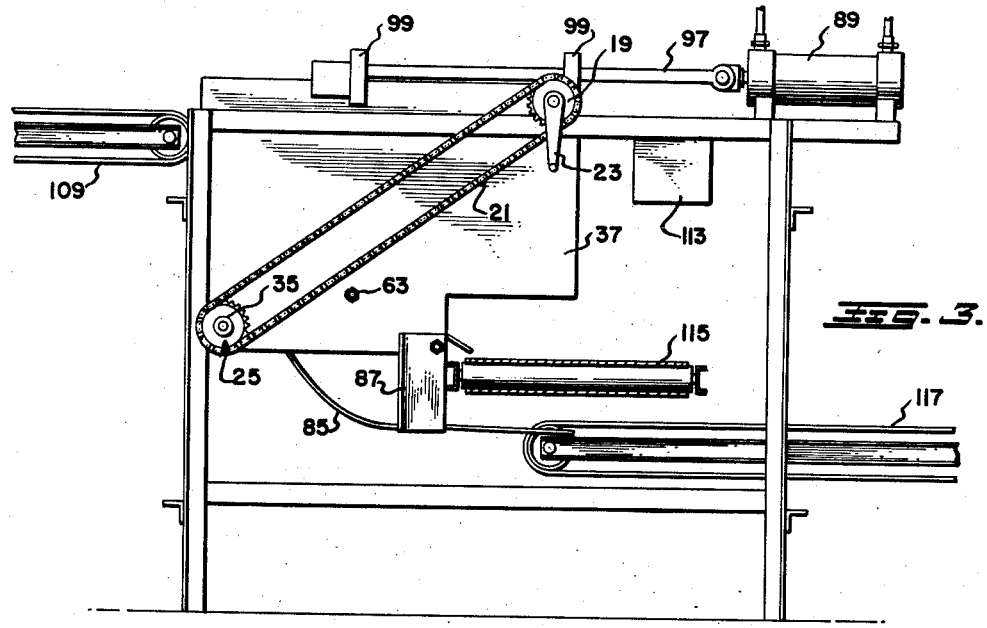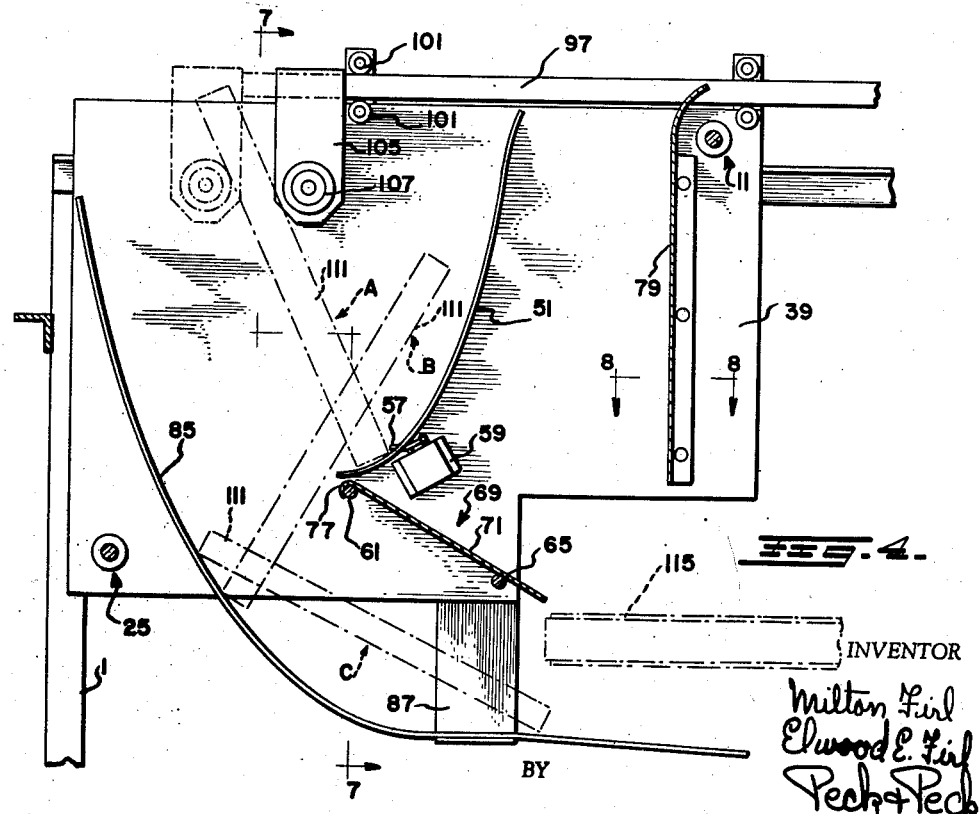

2,834,488

BAKERY PRODUCTS DEPANNING APPARATUS

Milton Firl and Elwood E. Firl, Meyersdale, Pa.

Application October 18, 1955, Serial No. 541,216

9 Claims. (Cl. 214—308)

This invention relates broadly to the art of removing baked goods from the pans or the like in which they have been baked, and in its more specific aspects it relates to a fully automatic apparatus for receiving the pans with the baked goods therein, removing the baked goods therefrom, and separating the pans from the removed baked goods and removing such separated baked goods and empty pans from the apparatus; and the nature and objects of the invention will be readily recognized and understood by those skilled in the arts to which it relates in the light of the following explanation and detailed drawings illustrating what we at present believe to be the preferred embodiments or mechanical expressions of our invention from among various other forms, arrangements, combinations and constructions, of which the invention is capable within the spirit and scope thereof.

A considerable problem has been and is being encountered by both large and small commercial bakeries in removing baked rolls, buns and the like from the pans in which they have been baked. In the absence of automatic depanning it will be recognized that the depanning operation is time consuming and expensive. We are aware that automatic machinery has been devised for this purpose, however such machinery is relatively complicated due, in most cases, to a plurality of moving parts, is expensive to produce and requires attention and repair, as well as being unsatisfactory in other respects.

It has been one of our primary purposes to provide a fully automatic depanning apparatus which is economical to produce and operate and involves relatively few moving parts. The apparatus of this invention may be marketed at a sufficiently low price so that it may be used by small bakeries, yet it has been designed for large baking operations as well, where it will be subjected to continuous operation for relatively long periods of time. Such operations will be efficiently and automatically carried on with our apparatus which requires little or no attention or maintenance.

In many instances the rolls, buns or other similar food product which has been baked in a pan is difficult to remove due to the product sticking to the pan. We have successfully overcome this difficulty by so constructing our apparatus that a jarring action is imparted to the pan as it is tilted so that the baked goods will freely fall therefrom. In many depanning apparatus of which we are aware separate and elaborate mechanisms are provided for removing stuck baked goods from the pan. The apparatus we have evolved requires no separate means to jar loose the stuck baked goods for we have arranged our mechanism in such a manner that in the normal operation of the apparatus the baked goods will be jarred loose so that they may fall freely out of the pan.

In order to simplify the mechanism employed to achieve our results and for a speedier and more efficient overall operation the pans are not fully inverted during the depanning operation and, what is more important, they are automatically carried from the apparatus in normal right side up position in readiness for the next baking operation. The advantages of this system will be recognized for the step of fully inverting each pan is eliminated as is the step of turning the inverted pan right side up. Thus, in our apparatus, which does not invert the pan in the depanning operation, the aforementioned two steps are eliminated thereby saving time, and the need for inverting mechanism is eliminated. Efficiency, economy and speed are thereby inherent in our concept over apparatus for this purpose which have heretofore been known.

We have also provided a simple and certain arrangement of parts whereby automatic segregation of the baked products and the pans is effected and they are separately carried from the apparatus so that the former may be packaged and the latter prepared for the next baking operation.

Our apparatus has been designed for use with pans of varying sizes. It may be quickly and easily adjusted to accommodate pans of different widths. This feature is of advantage for in many bakeries different sized pans are used and it is obvious that it would not be feasible to have a different depanning apparatus for each type of pan which might be used in a bakery.

The depanning apparatus of this invention while being economical to produce and operate is of lightweight yet sturdy construction and does not take up a substantial amount of space when installed in operative position in a bakery.

With the foregoing general objects, features and results in view, as well as certain others which will be apparent from the following explanation, the construction consists in certain novel features in design, construction and combination of elements, as will be more fully and particularly referred to and specified hereinafter.

Referring to the accompanying drawings:

Fig. 1 is a view in side elevation of the depanning apparatus.

Fig. 2 is a side view in vertical section.

Fig. 3 is a view in side elevation of the opposite side to that illustrated in Fig. 1 of the drawings.

Fig. 4 is a side view in vertical section illustrating the course a pan follows through the apparatus in a depanning operation.

Fig. 5 is a top plan view of the apparatus.

Fig. 6 is a front end view in elevation of the apparatus.

Fig. 7 is a view taken on line 7—7 of Fig. 4.

Fig. 8 is a view taken on line 8—8 of Fig. 4.

Fig. 9 is a detailed view illustrating certain of the operating elements whereby the apparatus is adjusted to accommodate pans of different widths.

The depanning apparatus illustrated in the accompanying drawing consists of a generally rectangular supporting framework comprising four upright supporting legs 1 upon which may be mounted a pair of horizontally disposed parallel side support members 3 and a pair of spaced horizontally disposed cross members 5 adjacent the rear end of the supporting framework. Usual reinforcing cross members 7 may connect the uprights or legs 1. The supporting framework may, if desired, be of angle iron construction and may, of course, be varied as to size, shape and reinforcing means and arrangement and still fall within the spirit and scope of our invention.

Rotatively journaled as at 9 on the side support members 3 and extending therebetween is a side wall adjusting and supporting shaft designated generally by the numeral 11, the shaft being provided with right and left hand threading 13 and 15, respectively, for a purpose to be hereinafter explained. At one end as at 17 the shaft extends beyond a side support member 3 and is provided with a sprocket wheel 19 upon which is mounted a sprocket chain 21, an operating crank or handle 23 being fixed on the extended end of shaft 11 so that the shaft and the sprocket may be rotated. A further side wall adjusting and supporting shaft designated generally by the numeral 25 is rotatively journaled as at 27 on front legs 1 and extends therebetween at a position forwardly and below the shaft 11, the shaft being provided with right and left hand threading 29 and 31, respectively. At one end the shaft 25 is provided with an extension 33 to which is fixed a sprocket wheel 35 over which the sprocket chain 21 is mounted, thus, the chain extends from sprocket wheel 19 to sprocket wheel 35 so that upon rotation of shaft 11 and sprocket wheel 19, sprocket wheel 35 and shaft 25 will be caused to rotate.

The apparatus includes a pair of side walls 37 and 39 which are of flat sheet like form and of generally rectangular configuration. These side walls are adjustably mounted on the shafts 11 and 25, the shaft 11 extending through the side walls adjacent the top and rear edges thereof while shaft 11 extends through the side walls adjacent the bottom and forward edges thereof. Each shaft mounts each side wall along the threaded portions of the shafts, thus side wall 37 is mounted on threaded portions 13 and 31 of shafts 11 and 25, respectively, while side wall 39 is mounted on threaded portions 15 and 29 of shafts 11 and 25, respectively.

The side walls are mounted on the shafts for adjustment toward and away from each other to endow the apparatus with flexibility in meeting pan width requirements as will become clear as this description proceeds. Where each threaded portion of each rod passes through the side walls any suitable means is provided for converting the rotary motion of the shafts into linear motion in the side walls. As one example which may be used reference is made to Fig. 9 of the drawings where we provide a bushing having a sleeve 41 passing through the side wall and about and in threaded engagement with the shaft, the sleeve is provided with a flange 43 in engagement with the side wall. To prevent rotary movement of the sleeve it is fixed by a set screw 45 to a ring 47 which in turn is fixed to the side wall by a set screw 49. When the shaft is rotated the sleeve 41, flange 43 and hence the side wall will move axially relative to the shaft.

It will now be appreciated that by operating the crank 23 the shafts 11 and 25 will be caused to rotate bringing side walls 37 and 39 either closer together or farther apart depending upon the direction of rotation of the crank, to thereby either increase or decrease the distance between the side walls. It will be recognized that means other than that illustrated in Fig. 9 may be used and still fall within our contemplation.

We fixedly mount in any suitable and convenient manner a pan guide rail 51 on the inner face of side wall 39 and a further similar pan guide rail 53 on the inner face of side wall 37. These pan guide rails are of similar configuration and extend from closely adjacent the top edge of each side rail with a slight forward curvature to a point spaced above the lower edge of each side wall. The pan guide rails 51 and 53 are relatively narrow strips of material such as metal and are preferably nylon covered. Consideration of the drawings shows that each pan guide rail is fixed along its edges to the side wall so that it extends for its narrow width into the area between the side walls and it will also be apparent that each pan guide rail is located in the same position on its side wall as the other pan guide rail. The pan guide rail 51 adjacent its lower end is slotted as at 55 for receiving therethrough the tripping lever 57 of any suitable electric switch, such as a microswitch 59 which may be mounted on side wall 39.

We fix a rod 61 on side wall 39 which extends inwardly therefrom and is telescopically received in a tubular element 63 which is fixed to side wall 37 and extends inwardly therefrom in alignment with said rod. Rearwardly and downwardly from said elements 61 and 63 we fix a further rod 65 on side wall 39 which extends inwardly therefrom and is telescopically received in a further tubular element 67 which is fixed to side wall 37 and extends inwardly therefrom in alignment with the rod 65. The rods and tubular elements which have just been described provide a supporting means for a baked product dump apron which we have designated in its entirety by the numeral 69. The dump apron is formed of two sheets 71 and 73 preferably of metal or plastic which extend over the 2 rods and tube supports in overlapping relation as at 75 as seen clearly in Fig. 7 of the drawings. Each sheet is provided with a curved upper edge 77 for hooking over rod 61 and tube 63 to thereby maintain the dump apron in proper operative position inclined downwardly from front to rear of the apparatus. It is to be understood that the baked product dump apron extends from one side wall to the other.

The apparatus is provided with a rear wall made up of two sections 79 and 81, the section 79 being fixed to and extending inwardly from side wall 39 while section 81 is fixed to side wall 37 to extend inwardly therefrom out of alignment with section 79 so that they will be in overlapping relation as shown at 83.

A pair of pan ejection guide rails 85 are provided for guiding the empty pans from the apparatus. One such guide rail being fixed to the inner face of each side wall, the rails being in alignment. The rails 85 are fixed to the side walls forwardly of the rails 51 and 53 and extend downwardly and rearwardly and below rails 51 and 53 and dump apron 69 and below the lower edges of the side rails where they extend in a more or less horizontal plane. The rails 85 are supported by hanger brackets 87 one of which is fixed to and extends downwardly from each side wall.

We mount a ram mechanism on cross members 5 which consists of a conventional cylinder 89 in whch a piston is operable in a conventional manner to actuate a piston rod 91. While we prefer to use a pneumatic mechanism a hydraulic system may be used. The cylinder 89 is provided with the usual fluid connection 93. At its forward end the piston rod 91 is connected to a cross member 95. We provide a pair of pan actuating rods 97, one being mounted on the top edge of each side wall 37 and 39 for horizontal reciprocal action therealong. A pair of brackets 99 are mounted on each side wall to extend upwardly above the upper edge thereof and each bracket is provided with a pair of vertically spaced rollers 101 on and between which the pan actuating rods reciprocate. At its rear end each pan actuating rod is connected with the cross member by ring or the like elements 103, the connection being such that the pan actuating rods 97 may be adjusted axially with respect to cross member 95. Each pan actuating rod 97 at its forward end carries a pan kicking element which consists of a depending bracket 105 carrying a pan supporting and fulcrum roller 107. The brackets 105 depend downwardly adjacent the inner sides of the side walls 37 and 39.

The depanning apparatus is adapted to be stationed at the discharge end of any suitable type of endless conveyor 109 which may extend from the oven in order to convey pans of baked goods to the depanning apparatus.

In operation with the depanning apparatus positioned with its front end adjacent the discharge end of the conveyor 109 the attendant adjusts the apparatus to accommodate a run of pans of a particular size from the oven. The adjustment of the apparatus is accomplished by turning the crank 23 in one direction or the other, depending upon the width of the pans being handled. Operation of the crank causes rotation of the side wall supporting and adjusting shafts 11 and 25 which either moves the side walls 37 and 39 closer together or further apart. The rear wall is either widened or narrowed and thus is accomplished due to the overlapping arrangement of rear wall sections 79 and 81. In a similar manner the width of the baked product dump apron is varied and the supporting rods 61 and 65 either extend further into or out of the tubular members 63 and 67. Similarly the rods 97 may be moved either closer together or further apart due to being connected to member 95 by the rings 103.

With the apparatus adjusted as described to receive the pans with the baked goods therein the piston rod 91 is in projected position as illustrated in Fig. 2 and the pan actuating rods 97 are in projected or forward position disposing the rollers or pan supporting members 107 adjacent the forward end of the apparatus. It will be seen that the upper surfaces of rollers 107 are in substantially the same plane as the upper surface of conveyor 109.

When our depanning apparatus is in operation one pan 111 at a time is discharged from the conveyor 109 and rides on and is supported by the rollers 107 until it has progressed sufficiently far into the apparatus so that the portion of the pan extending inwardly beyond the rollers overbalances the rest of the pan so that it rocks inwardly and downwardly on the rollers which at this point in the operation act as a fulcrum for the pan. The pan tilts or rocks on the rollers 107 into the position illustrated in dotted lines in Fig. 2 of the drawings. As the pan tilts or rocks downwardly its forward, or at this point, its lower edges at each side engage and are guided by the pan guide rails 51 and 53 which are fixed on each side wall. As the pan engages these pan guide rails it trips lever 57 of switch 59 which closes a circuit and through any conventional electrical means actuates four way valve 113 which is in communication with cylinder 89 to actuate the piston therein with the resulting reciprocation of rod 91 and rods 97. The valve 113 for controlling the flow of fluid to the cylinder may, if desired, be actuated by a solenoid which is energised by closing of switch 59.

Upon actuation of the mechanism just described piston rod 91, pan actuating rods 97 and the rollers 107 are retracted or pulled rearwardly. When this retraction occurs the fulcrum function of rollers 107 ceases and the rollers function as pan kicking or rocking elements for they engage the upper under side of the pan and rock or swing it rearwardly with respect to the apparatus, such rocking occurring while the lower end of the pan rests on pan guide rails 51 and 53. In Fig. 4 of the drawings pan 111 is shown in dotted lines in position A as the rollers engage and start the pan rocking operation. From position A the pan is rocked to a dumping position where it is in an upright but rearwardly inclined position. As the rollers engage the under side of the pan an impact occurs which is sufficiently sharp to knock the baked products from the pan so that they will fall therefrom onto inclined dump apron 69 and roll therealong onto a baked product conveyor 115 which carries them out of the apparatus. When the pan is emptied of its baked products by being rocked partially over by the rollers the lower end of the pan slips off the lower ends of pan guide rails 51 and 53 into position B, the lower ends of the pan then engaging and being supported by the pan ejection guide rails 85. As the pan follows the course illustrated in Fig. 4 it releases switch lever 57 the switch is thereby opened and the rods 97 are projected into the position illustrated in Fig. 2 in readiness to receive the next pan from the conveyor 109.

The pan 111 slides out of the apparatus along rails 85 as shown at C in Fig. 4 and is received on a pan conveyor 117 by which the pans are removed from the apparatus.

It will now be recognized that we have devised a depanning apparatus which is fully automatic, yet is relatively simple in construction and operation and involves few moving parts, and which accomplishes the purposes set forth herein in an efficient manner.

We claim:
1. A baked product depanning apparatus adapted to receive pans from a conveyor, including fulcrum elements for initially supporting a pan as it is fed from the conveyor and for permitting said pan to rock downwardly when a portion thereof has passed beyond said fulcrum elements, pan supporting and guiding means for supporting the pan on its lower end when it has rocked downwardly, and mechanism operably connected with said fulcrum elements and operable after the pan has rocked downwardly and is supported on said pan supporting and guiding means to move said fulcrum elements into position engaging the under side of the pan adjacent the upper end thereof and rocking it rearwardly to dump the baked products from the pan, and further means engageable by said pan when it rocks downwardly and operated thereby to cause said mechanism to operate.

2. A baked product depanning apparatus adapted to receive pans from a conveyor, including means causing the forward end of the pan to rock downwardly as it is fed into the apparatus, downwardly extending and forwardly curved pan supporting and guiding means for supporting the pan on its lower end when it has rocked downwardly, mechanism operable after the pan has rocked downwardly and is supported on said pan supporting and guiding means to engage the under side of the pan adjacent the upper end thereof to rock it rearwardly to dump the baked products from the pan and to cause the lower end of the pan to slip from the lower end of the pan supporting and guiding means, and further means extending downwardly and curved rearwardly and spaced from said pan supporting and guiding means for receiving the pan and causing it to move from the apparatus in right side up condition, and still further means engageable by said pan when it rocks downwardly and operated thereby to cause said mechanism to operate.

3. A baked product depanning apparatus in accordance with claim 2 wherein a baked product dump apron is positioned below and rearwardly of said pan supporting and guiding means and above and spaced from said further means to receive the dumped baked products and guide them from the apparatus.

4. A baked product depanning apparatus adapted to receive pans from a conveyor, including fulcrum elements for initially supporting a pan as it is fed from the conveyor and for permitting said pan to rock downwardly when a portion thereof has passed by said fulcrum elements, means for slidably supporting and guiding the lower end of said pan when it has rocked downwardly, a switch and switch operating element mounted adjacent said means and said operating element being in the path of the pan and engageable thereby to close the switch, mechanism connected with and controlled by said switch causing said fulcrum elements to move rearwardly engaging the under side of the pan to rock it rearwardly to dump the baked products therefrom, and to cause the lower end thereof to fall from said means, and mechanism for moving the baked products from the apparatus and further mechanism for moving the emptied pans from the apparatus.

5. A baked product depanning apparatus adapted to receive pans from a conveyor, including a pair of spaced side walls and a supporting framework therefor, a rod reciprocally mounted on the top edge of each side wall, mechanism for actuating said rods, a fulcrum element fixedly connected to the forward end of each rod, said fulcrum elements adapted to initially support a pan as it is fed into the apparatus from the conveyor and for permitting said pan to rock downwardly when a portion thereof has passed beyond said fulcrum elements, pan supporting and guiding means for supporting the pan on its lower end when it has rocked downwardly, means connected with said mechanism and mounted on a side wall adjacent said pan supporting and guiding means and engageable by said pan when it is supported on said pan supporting and guiding means to cause actuation of said mechanism to reciprocate said rods and fulcrum elements, said fulcrum elements moving into position engaging the under side of the pan adjacent the upper end thereof and rocking it rearwardly to dump the baked products therefrom.

6. A baked product depanning apparatus in accordance with claim 5 wherein said side walls are movably connected to said supporting framework for movement to and from each other to vary the distance between the side walls to accommodate pans of varying widths.

7. A baked product depanning apparatus in accordance with claim 5 wherein shafts are rotatively mounted on said supporting framework and are provided with right and left hand threading adjacent their ends, the shafts threadedly extending through and between said side walls and means for rotating said shafts to vary the distance between the side walls to accommodate pans of varying width.

8. A baked product depanning apparatus in accordance with claim 5, wherein said mechanism includes a fluid actuated piston connected with said rods and a valve for controlling the flow of fluid to the cylinder in which the piston operates, and said means includes an electric switch controlling the operation of said valve.

9. A baked product depanning apparatus adapted to receive pans from a conveyor, including a pair of spaced side walls and a supporting framework therefor, brackets having vertical spaced rollers thereon mounted on each side wall to extend thereabove, a rod reciprocally mounted on each side wall between said rollers, mechanism for reciprocating said rods, a bracket fixed on and depending from the end of each rod and each bracket carrying a fulcrum element adjacent its lower end, said fulcrum elements adapted to initially support a pan as it is fed into the apparatus from the conveyor and for permitting said pan to rock downwardly when a portion thereof has passed beyond said fulcrum elements, pan supporting and guiding means for supporting the pan on its lower end when it has rocked downwardly, means connected with said mechanism and mounted on a side wall adjacent said pan supporting and guiding means and engageable by said pan when it is supported on said pan supporting and guiding means to cause actuation of said mechanism to reciprocate said rods and fulcrum elements, said fulcrum elements moving into position engaging the under side of the pan adjacent the upper end thereof and rocking it rearwardly to dump the baked products therefrom.

References Cited in the file of this patent

UNITED STATES PATENTS

| | | |
|---|---|---|
| 894,307 | Zofnass | July 28, 1908 |
| 996,386 | Williams | June 27, 1911 |
| 1,868,058 | Furness | July 19, 1932 |
| 2,378,948 | Paxton et al. | June 26, 1945 |
| 2,639,828 | Otte | May 26, 1953 |
| 2,649,058 | Holbeck | Aug. 18, 1953 |
| 2,715,973 | Winfree et al. | Aug. 23, 1955 |